(12) United States Patent
Praun et al.

(10) Patent No.: US 8,166,042 B1
(45) Date of Patent: Apr. 24, 2012

(54) HEIGHT BASED INDEXING

(75) Inventors: Emil C. Praun, Fremont, CA (US);
Costa Touma, Santa Clara, CA (US);
Paul S. Strauss, Sunnyvale, CA (US);
Tushar Udeshi, Broomfield, CO (US)

(73) Assignee: Google Inc., Mountainview, CA (US)

( * ) Notice: Subject to any disclaimer, the term of this patent is extended or adjusted under 35 U.S.C. 154(b) by 292 days.

(21) Appl. No.: 12/419,687

(22) Filed: Apr. 7, 2009

Related U.S. Application Data

(60) Provisional application No. 61/044,887, filed on Apr. 14, 2008.

(51) Int. Cl.
*G06F 17/30* (2006.01)
(52) U.S. Cl. .......... 707/743; 707/919; 707/921
(58) Field of Classification Search .......... 715/848, 715/760; 707/919, 920, 921, 724, 725, 943
See application file for complete search history.

(56) References Cited

U.S. PATENT DOCUMENTS

| | | | |
|---|---|---|---|
| 7,643,673 B2* | 1/2010 | Rohlf et al. | 382/154 |
| 7,746,343 B1* | 6/2010 | Charaniya et al. | 345/428 |
| 7,933,395 B1* | 4/2011 | Bailly et al. | 379/201.04 |
| 7,933,929 B1* | 4/2011 | McClendon et al. | 707/802 |
| 2008/0016472 A1* | 1/2008 | Rohlf et al. | 715/848 |
| 2009/0172507 A1* | 7/2009 | Choe | 714/819 |

* cited by examiner

*Primary Examiner* — Jean M Corrielus
(74) *Attorney, Agent, or Firm* — Sterne, Kessler, Goldstein & Fox P.L.L.C.

(57) ABSTRACT

The present invention provides a system and method for height based indexing of data. In an embodiment, the present invention parses indexed data by (1) storing a geo-spatial multi-resolution data structure that represents a three dimensional environment, where at least a portion of the three dimensional environment lies within a view frustum; (2) traversing recursively the geo-spatial multi-resolution data structure, where the traversal is based on a range of coordinates that lie within the view frustum; and (3) extracting the indexed data from at least one vertical slice of at least one node of the geo-spatial multi-resolution data structure, where the extracted indexed data is displayed in the view frustum.

20 Claims, 6 Drawing Sheets

HEIGHT BASED INDEXING

CROSS REFERENCE TO RELATED APPLICATIONS

The present application claims the benefit of U.S. Provisional Patent Application No. 61/044,887, filed on Apr. 14, 2008, entitled "Height Based Indexing" by Praun et al., which is incorporated herein by reference in its entirety.

FIELD OF THE INVENTION

The present invention relates to computer graphics technology.

BACKGROUND

Quadtree data structures are useful for storing data. One such data structure is a geo-spatial quadtree that stores two dimensional information related to the Earth or other geographical data. Each node of the geo-spatial quadtree includes four children, where each child covers a fourth of the area of the parent.

When storing three dimensional information however, a geo-spatial quadtree will not suffice. In this case, an octree data structure may be useful. An octree is a three dimensional representation of a quadtree, where each node has eight children instead of four. Imagining a parent node of the octree as covering a cubic volume, each child node covers an eighth of the cubic volume. When three dimensional information about a space is stored, such as in a representation of the Earth, no three dimensional information may be present for several quadtree or octree levels. Because of this, the upper levels of the octree may contain empty nodes, increasing the indexing and/or parsing overheads without providing helpful data.

BRIEF SUMMARY OF THE INVENTION

Embodiments of this invention relate to indexing and parsing of indexed data. A system embodiment includes a frame updater/level of detail (LOD) determiner that is configured to receive and store a geo-spatial multi-resolution data structure that represents a three dimensional environment, where at least a portion of the three dimensional environment lies within a view frustum. The frame updater/LOD determiner is also configured to traverse recursively the geo-spatial multi-resolution data structure, where the traversal is based on a range of coordinates that lie within the view frustum. And finally, the frame updater/LOD determiner is configured to extract the indexed data from at least one vertical slice of at least one node of the geo-spatial multi-resolution data structure, where the extracted indexed data is displayed in the view frustum.

A method embodiment of this invention parses indexed data. The method embodiment includes receiving and storing a geo-spatial multi-resolution data structure that represents a three dimensional environment, where at least a portion of the three dimensional environment lies within a view frustum, traversing recursively the geo-spatial multi-resolution data structure, where the traversal is based on a range of coordinates that lie within the view frustum, and extracting the indexed data from at least one vertical slice of at least one node of the geo-spatial multi-resolution data structure, where the extracted indexed data is displayed in the view frustum.

In this way three dimensional data may be stored in a geo-spatial multi-resolution data structure to account for object heights while minimizing indexing and/or parsing overheads. The vertical slices help balance the granularity of data access with the overhead of the geo-spatial multi-resolution data structure and its addressing scheme.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. Embodiments of the invention are described with reference to the accompanying drawings. In the drawings, like reference numbers may indicate identical or functionally similar elements. The drawings in which an element first appears is generally indicated by the left-most digit in the corresponding reference number.

Figure 5A:
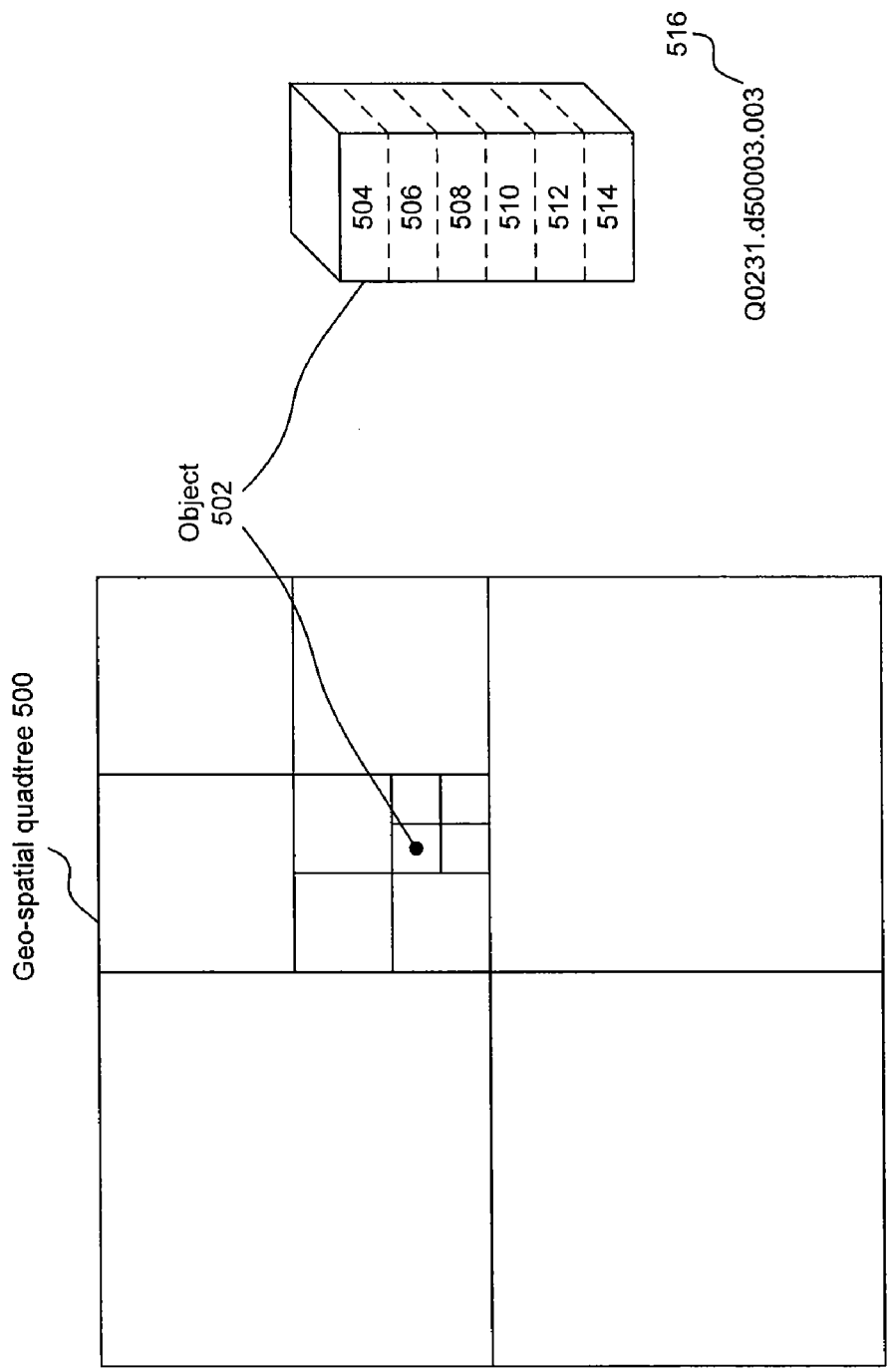
Figure 5B:
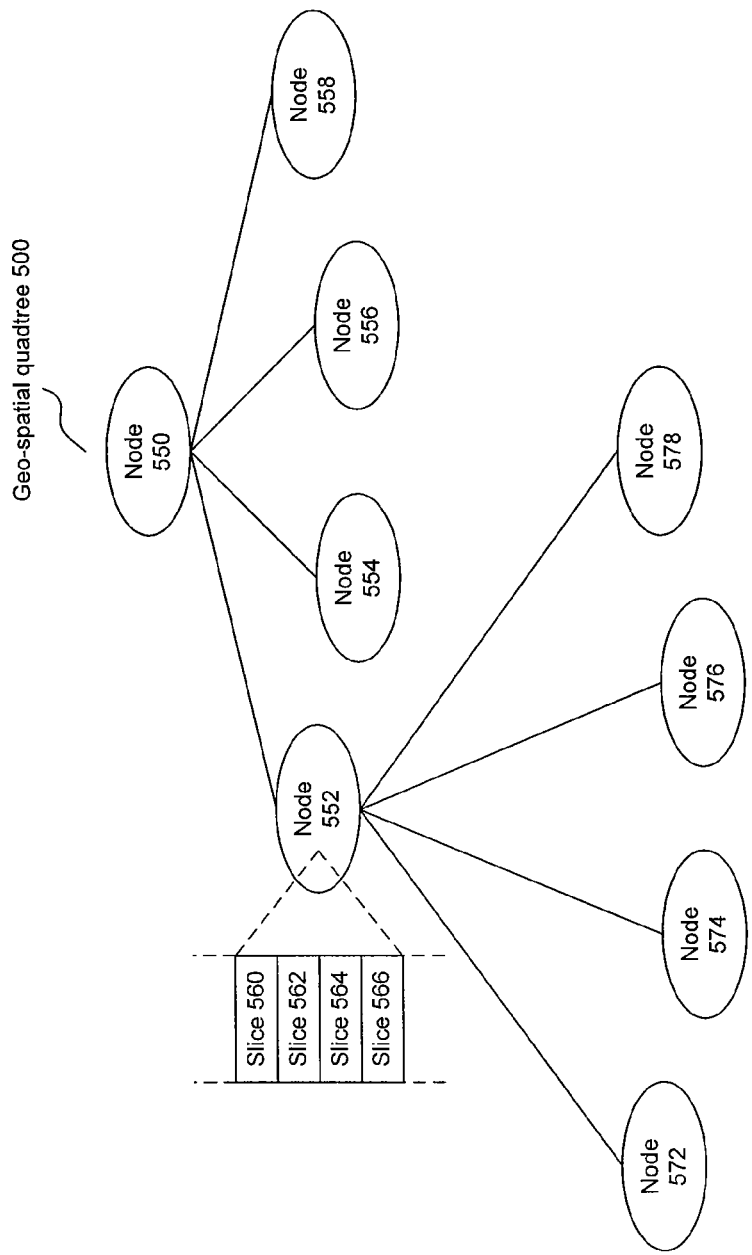

FIGS. 5A-B are examples of a geo-spatial multi-resolution data structure according to an embodiment of the present invention.

DETAILED DESCRIPTION OF EMBODIMENTS

The present invention relates to indexing and parsing of indexed data. This can include height based indexing of data. One feature is to minimize these indexing and/or parsing overheads when storing three dimensional information.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility. The following sections describe a system and method for height based indexing of data in greater detail.

System

Figure 1:
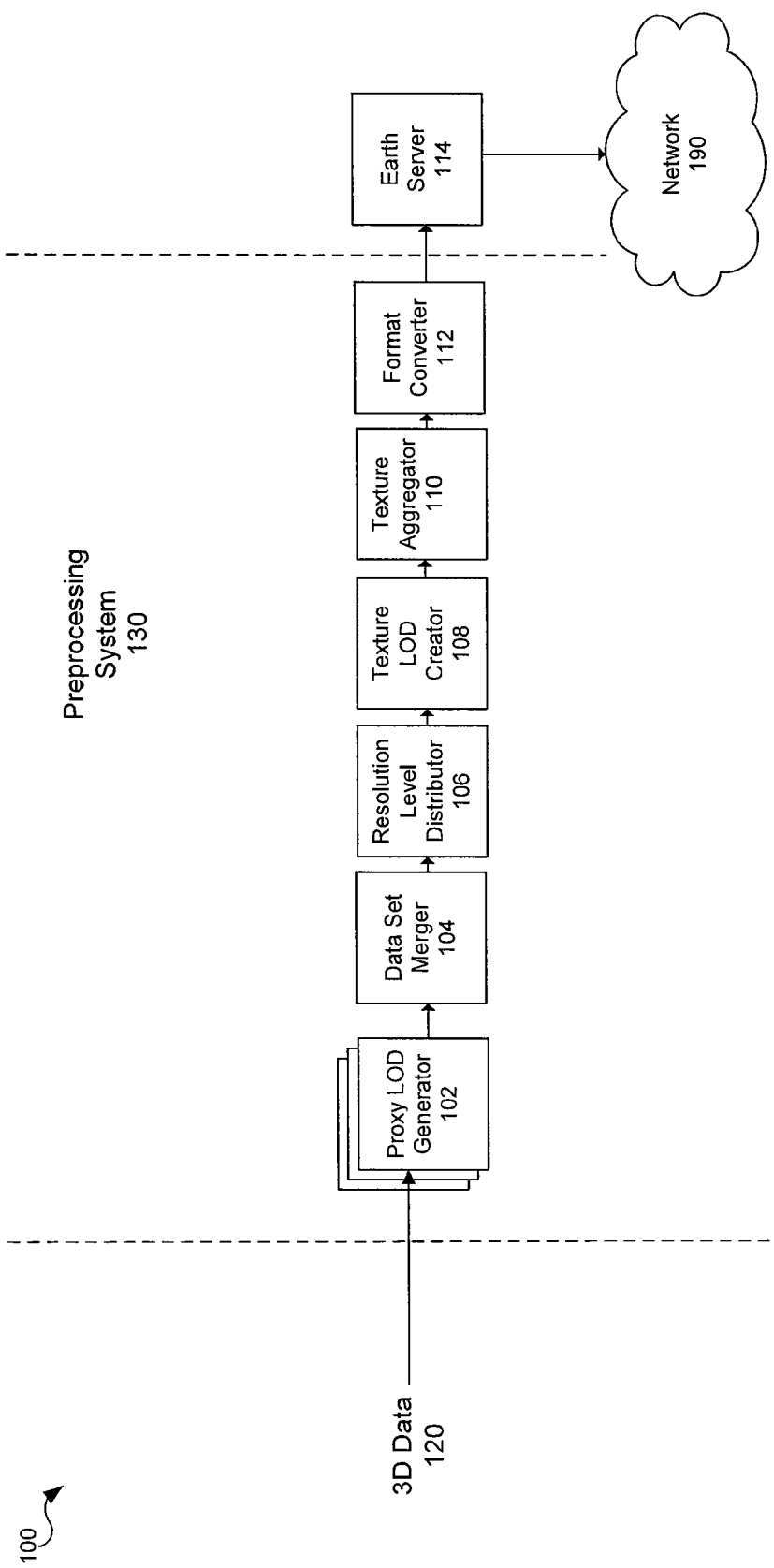
FIG. 1 is a diagram of a system suitable for indexing data according to an embodiment of the present invention.

This section describes a system suitable for indexing data. FIG. 1 is an architecture diagram of a system 100 suitable for indexing data according to an embodiment of the present invention. System 100 includes a preprocessing system 130, earth server 114 and network 190. Preprocessing system 130 further includes a proxy level of detail (LOD) generator 102, a data set merger 104, a resolution level distributor 106, a texture LOD creator 108, a texture aggregator 110, and a format converter 112. Preprocessing system 130 can be coupled to earth server 114. Preprocessing system 130 can communicate with network 190 through earth server 114. In further embodiment, preprocessing system 130 can also be coupled directly to network 190 through connections not shown for clarity.

In an embodiment, preprocessing system 130 (and its components including a proxy level of detail (LOD) generator 102, a data set merger 104, a resolution level distributor 106, a texture LOD creator 108, a texture aggregator 110, and a format converter 112) can include pipelined processing or other processing arrangements to carry out its tasks as would be apparent to a person skilled in the art given this description.

Preprocessing system 130 may be implemented on a computing device. Such a computing device may include, but is not limited to, a personal computer, mobile device such as a mobile phone, workstation, embedded system, game console, television, or set-top box. Such a computing device may include, but is not limited to, a device having one or more processors and memory for executing and storing instructions. Such a computing device may include software, firmware, hardware, or a combination thereof. Software may include one or more applications and an operating system. Hardware may include, but is not limited to, a processor, memory and graphical user interface display. Preprocessing system 130 may also be implemented across a plurality of computing devices or server farms.

Network 190 may be any type of network or combination of networks that can carry data communication. Such network 190 can include, but is not limited to, a local area network, medium area network and/or wide area network such as the Internet. Network 190 may be in a form of a wired network or a wireless network. Network 190 can support protocols and technology including, but not limited to, World Wide Web protocols and/or services. Intermediate web servers, gateways, or other servers may be provided between components of system 100 depending upon a particular application or environment. In an embodiment, earth server 114 may communicate over network 190.

Proxy LOD generator 102 receives three dimensional data 120. Three dimensional data 120 may include image data from various sources, including, but not limited to, LIDAR (Light Detection and Ranging) imagery, user contributed data, topographic data, and street and aerial imagery. In an embodiment, proxy LOD generator 102 uses three dimensional data 120 to generate proxy LODs. Proxy LOD generation is described in greater detail in Provisional Application No. 61/044,865, filed Apr. 14, 2008, entitled "Proxy Based Approach For Generation of Level of Detail," which is incorporated herein by reference in its entirety.

Data set merger 104 merges textures associated with three dimensional data 120 obtained from a plurality of sources into one or more datasets.

Resolution level distributor 106 may distribute the one or more objects of interest included in the datasets obtained from data set merger 104 and the proxy LODs generated by proxy LOD generator 102 to various resolution levels of a geo-spatial multi-resolution data structure. In a further embodiment, the one or more objects of interest may be distributed to vertical slices of the geo-spatial multi-resolution data structure. Each vertical slice may store a portion of three dimensional data 120 that corresponds to an altitude range. Vertical slices are described in more detail below with respect to FIG. 3.

Texture LOD creator 108 generates a resolution pyramid for each texture used by the objects of interest. In an embodiment, texture LOD creator 108 may store each texture having a certain resolution at a node of the geo-spatial multi-resolution data structure, where the resolution of a texture level as applied to an object of interest approximately corresponds to the resolution of the multi-resolution data structure node where it is stored. For example, the resolution of the texture level as applied to the object of interest may be 1 meter per pixel and the resolution of the multi-resolution data structure node where it is stored may be 6 meters per pixel. This is illustrative and other resolutions may be used.

Texture aggregator 110 aggregates a plurality of textures at multiple resolutions, creating several texture trees or a forest. Each texture tree is associated with a set of objects (for example, buildings) made up of triangles or polygons (corresponding to façades, roofs, etc). In an embodiment, texture aggregator 110 may store each texture having a certain resolution at a node of a multi-resolution spatial data structure organizing the objects of interest. The multi-resolution spatial data structure may be, for example, a quadtree. Textures having the same resolution when applied to an object of interest may share a common level in the multi-resolution spatial data structure.

Each node in a texture tree represents an aggregated atlas texture at a given resolution. The texture at the given resolution can have zero or more children, containing textures at a higher resolution (e.g. double the resolution) in each of the two texture dimensions. Such child textures can replace a rectangular sub-region of a parent node texture. In an embodiment, the sub-regions corresponding to different child nodes do not overlap.

In an embodiment, the objects of interest using textures from a given texture tree in the texture forest are stored at the same geo-spatial multi-resolution data structure node where the root of the texture is also stored.

Format converter 112 may convert the textures aggregated by texture aggregator 110 into a format used by earth server 114 to transmit the textures over network 190. As an example, format converter 112 may convert textures to a highly compressed format, such as, for example, JPEG 2000 image format. JPEG 2000 is an image compression standard known to those skilled in the art.

Earth server 114 may transmit both textures and three dimensional geometries over network 190. At run time, for example, earth server 114 may fulfill requests made by client 210. In one exemplary embodiment, earth server 114 may include a web server or may be coupled to communicate with a web server at the same or a different location. A web server is a software component that responds to a hypertext transfer protocol (HTTP) request with an HTTP response. As illustrative examples, the web server may be, without limitation, an Apache HTTP Server, Apache Tomcat, MICROSOFT Internet Information Server, JBOSS Application Server, WEBLOGIC Application Server, or SUN JAVA System Web Server. The web server may contain web applications which generate content in response to an HTTP request. The web server may package the generated content and serve the content to a client in the form of an HTTP response. Such content may include hypertext markup language (HTML), extensible markup language (XML), documents, videos, images, multimedia features, or any combination thereof. This example is strictly illustrative and does not limit the present invention.

In an embodiment, client 210 processes a texture tree generated by preprocessing system 130 and transmitted in part by earth server 114 over network 190. Client 210 may choose which texture resolution to use when rendering a part of an object of interest and use the same single set of texture coordinates for all possible resolutions of that texture in the texture tree. Per-vertex texture coordinates need not be computed at each resolution level while traversing the texture tree.

In an embodiment, the nodes of texture trees in a texture forest may be associated with the nodes of a spatial structure, such as, for example, a quadtree. Since it may be impractical to transmit the whole texture forest over a network to a client, such as from network 190 to client 210, the client can use the geo-spatial multi-resolution data structure to decide what parts of the forest to fetch. In other words, the client may only download the parts of the forest that may be needed to render the scene currently in view.

Figure 2:
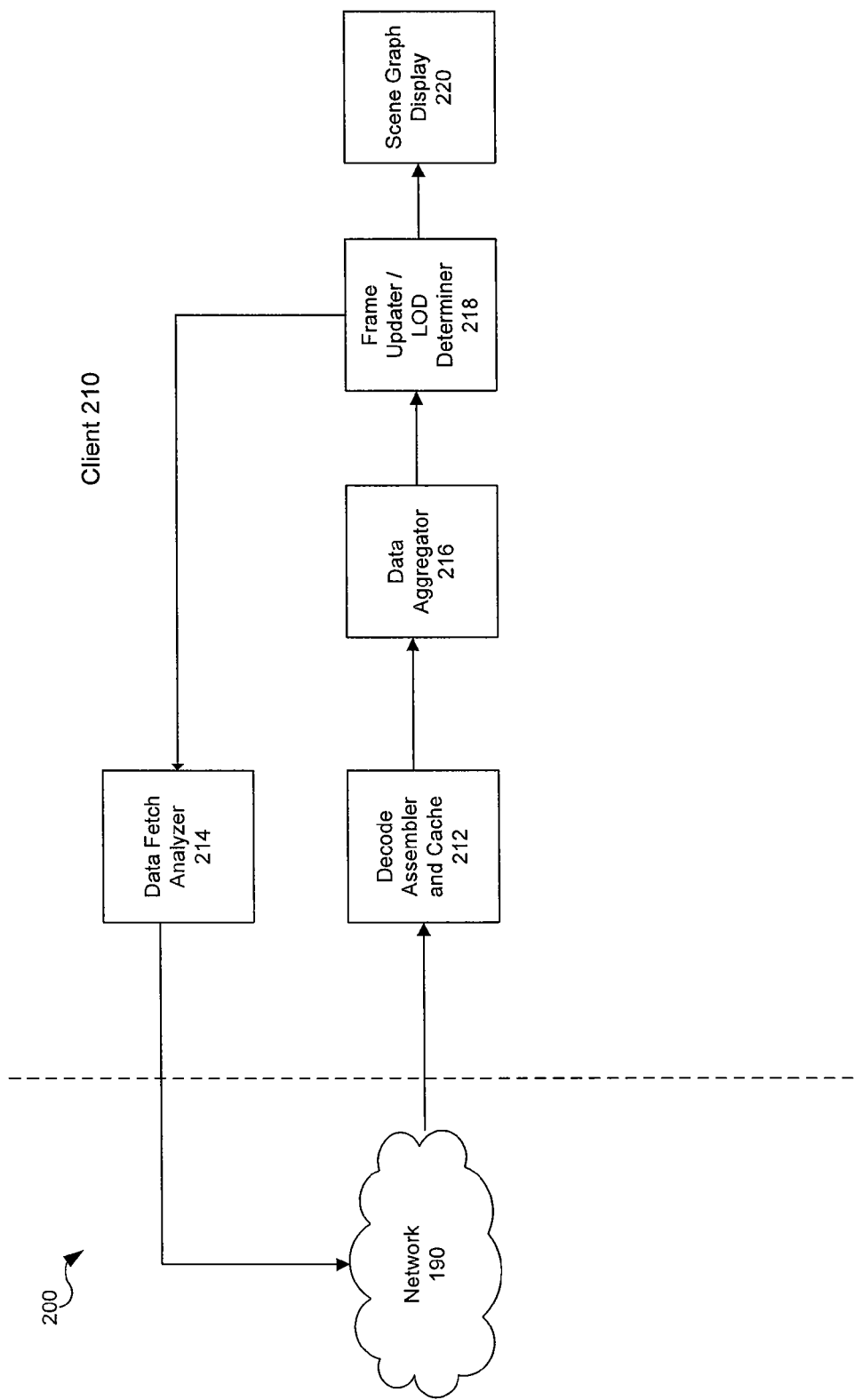
FIG. 2 is a diagram of a system suitable for parsing indexed data according to an embodiment of the present invention.

FIG. 2 illustrates an architecture diagram of a system suitable for parsing data according to an embodiment of the present invention. FIG. 2 shows system 200. System 200 includes client 210. Client 210 includes a decode assembler and cache 212, a data fetch analyzer 214, a data aggregator 216, a frame updater/LOD determiner 218, and a scene graph display 220.

In an embodiment, preprocessing system 130 transmits data over network 190. Data transmitted by preprocessing system 130 over network 190 may be received by client 210.

Client 210 may be implemented on a computing device. Such a computing device can include, but is not limited to, a personal computer, mobile device such as a mobile phone, workstation, embedded system, game console, television, or set-top box. Such a computing device may include, but is not limited to, a device having one or more processors and memory for executing and storing instructions. Such a computing device may include software, firmware, hardware, or a combination thereof. Software may include one or more applications and an operating system. Hardware can include, but is not limited to, a processor, memory and graphical user interface display. Client 210 may also be implemented across multiple computing devices or server farms.

In an embodiment, decode assembler and cache 212 receives data from network 190. As an example, this data may comprise three dimensional data relating to geometries of various objects of interest in a scene. Furthermore, data may include image data in highly compressed formats, such as, for example, the JPEG 2000 format. As an example, decode assembler and cache 212 may convert the data from a received format to another format that may be less efficiently compressed, but more suitable for direct rendering by client 210. Additionally decode assembler and cache 212 may assemble and store the decoded data into data sets that may be used by client 210 for further processing.

Data fetch analyzer 214 processes each node of the geospatial multi-resolution data structure that intersects the current view to be rendered by client 210 and whose resolution is not too detailed for the current view. Data fetch analyzer 214 downloads metadata for these multi-resolution data structure nodes from earth server 114. The multi-resolution data structure node metadata may indicate that the multi-resolution data structure nodes contain geometric objects or textures, which are then downloaded.

Data aggregator 216 may receive a plurality of data sets that includes texture and geometry data relating to objects of interest and other objects in a scene. Data aggregator 216 may then aggregate the data sets before they are provided to frame updater/LOD determiner 218. As an example, data aggregator 216 may further aggregate textures and geometric objects using the same texture trees described above. Aggregation of various data sets may improve efficiency of client 210.

Similarly to textures having multiple resolution levels organized in a tree, geometric objects may have multiple, progressively more complicated representations organized in LOD trees. For example, coarse representations of objects may be generated in preprocessing system 130 by proxy LOD generator 102. Frame updater/LOD determiner 218 processes a plurality of geometry LOD trees and texture trees received from data aggregator 216. In an embodiment, frame updater/LOD determiner 218 may determine LODs for all geometry and texture objects and update LODs that have been determined. Frame updater/LOD determiner 218 is described in more detail below with respect to FIG. 3.

In an embodiment, a scene graph may be considered a representation that includes information about the geometry and appearance of all objects appearing on a graphical display. As an example, a scene graph may be a dynamic data structure within a computer program. A scene graph may include data that describes shape objects (geometry and appearance), geometric structure relationships (geometric transformations, ordering, and grouping), global objects (how all shape objects are viewed, e.g. viewpoints, lights, backgrounds), and behaviors (procedures for modifying information stored in a scene graph).

As an example, not intended to limit the invention, a scene graph is implemented using object-oriented computer programming techniques. Thus, scene graph objects can be provided as object-oriented software objects, which may describe shape objects. For example, a scene graph can include a software object associated with a building image, and a scene graph display command can operate on the building object to render the building image on a graphical display.

Objects of a scene graph, for example, may be generated using software commands, for example a "create" command. The objects of a scene graph are operated upon using other commands, for example a "render" command, which causes an object to appear as an image on a video screen. Therefore, the scene graph, including the objects, is associated with a set of scene graph display commands.

A scene graph can be represented diagrammatically as a tree structure having "nodes" and interconnecting lines or "arcs." The scene graph data structure described above underlies the tree structure representation. The scene graph can also be associated with a sequence of display commands, which can be used to generate the underlying data structure of the scene graph.

It should be understood that a scene graph can be associated with more scene graph display commands than actually are used to generate images on a graphical display. For example, a scene graph can be associated with a set of "create" commands that represent scene graph objects, and not every object necessarily has a corresponding "render" command that generates an image on the graphical display.

Various high-level software application programmer interfaces (APIs) have been established to create a scene graph when presented with the scene graph display commands. For example Java3D and VRML provide high-level software to generate a scene graph. Lower level APIs have also been provided, including Open GL, and Direct 3D. Application software, for example computer games, has been developed to provide the scene graph display command to an API.

In an embodiment, a scene graph generated and updated by frame updater/LOD determiner 218 may be provided to scene graph display 220. Scene graph display 220 renders a scene graph for display so that a scene may be viewed by a user of client 210.

As an example, scene graph display 220 may be associated with a 3D graphics circuit board having local processing capability, and the ability to interpret scene graph data and rapidly provide a corresponding graphical display on a monitor.

Exemplary scene graph programming techniques, in conjunction with the 3D graphic circuit board, provide the ability to rapidly render a 3D image on a graphical display. Images on the graphical display can also be rapidly updated with one or more display commands, provided by the application software, interpreted by the API, and sent to the 3D graphics circuit board.

Figure 3:
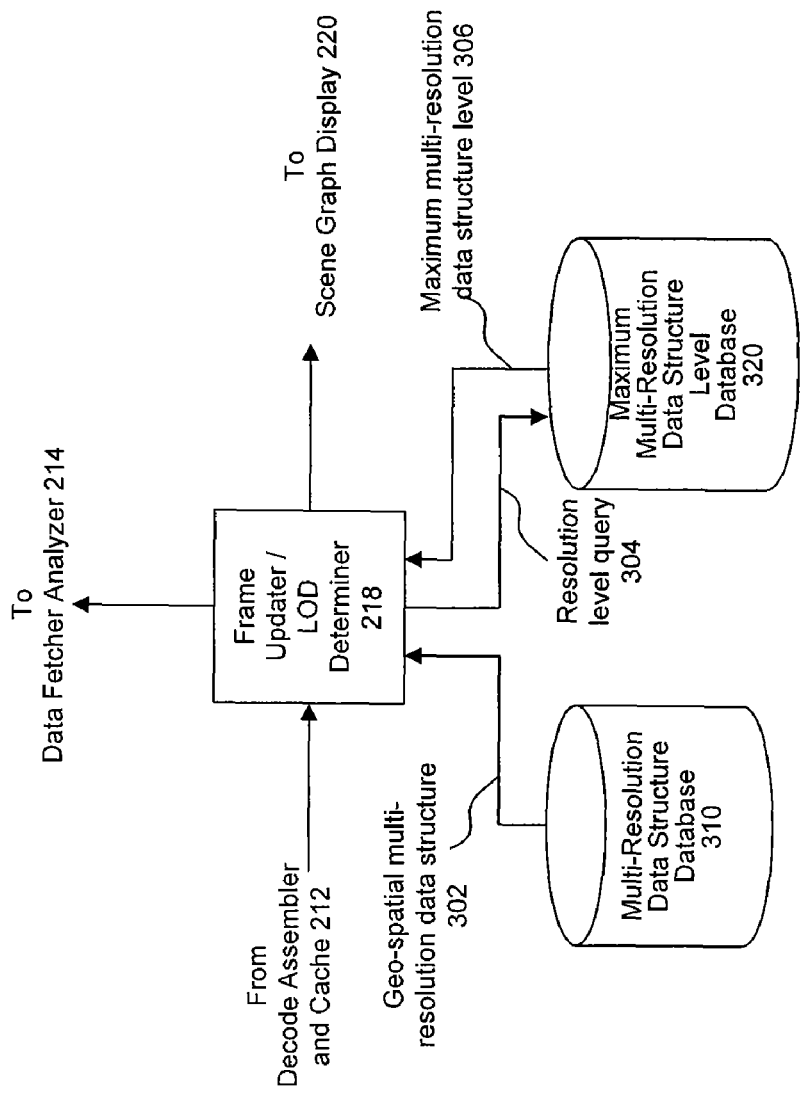
FIG. 3 is a more detail diagram of a frame updater/LOD determiner according to an embodiment of the present invention.

FIG. 3 is a more detailed diagram of frame updater/LOD determiner 218 according to an embodiment of the invention.

As shown in FIG. 3, frame updater/LOD determiner 218 is coupled to a multi-resolution data structure database 310 and a maximum multi-resolution data structure level database 320. As used herein, the term "database" includes, but is not limited to, table databases, hierarchical databases, network databases, relational databases, dimensional databases, and/or object databases.

In an embodiment, multi-resolution data structure database 310 stores a geo-spatial multi-resolution data structure, such as the geo-spatial multi-resolution data structure described above with respect to FIG. 1. The geo-spatial multi-resolution data structure represents a map of the world, where the root node of the geo-spatial multi-resolution data structure covers a square area in which the top and bottom horizontal quarters are blocked off and the middle two horizontal quarters include the entire map. Latitude/longitude parameterization may be used in the geo-spatial multi-resolution data structure, where, for example, the North Pole is stretched out to cover the whole horizontal line along the top of the top middle horizontal quarter and the Equator is mapped to the horizontal line separating the top middle horizontal quarter from the bottom middle horizontal quarter. The four first level nodes, or the root node's children, correspond to the four quadrants created by splitting the square that the root node corresponds to into four equal parts. In general, each child node covers a fourth of the area as its parent node. The area each node covers can be represented by a range of latitudes and longitudes. For example, the root node covers a 360 degree range of latitudes and longitudes, the first level nodes each cover a 180 degree range of latitudes and longitudes, the second level nodes each cover a 90 degree range of latitudes and longitudes, and so on. The latitude and longitude ranges may correspond to a spherical polygon on a surface of a three dimensional environment, such as, for example, a flat Earth.

The geo-spatial multi-resolution data structure may hold data at each node, including, but not limited to, geometry data, image data, and/or placemarks. As an example, the data held at each node may include characteristics of three dimensional objects like buildings. As used herein, the data held at each node is described as if they include characteristics for buildings that reside in a three dimensional environment, such as, for example, a three dimensional representation of Earth. However, this is not meant to be limiting, as the data held at each node can be any type of data. Each level of the geo-spatial multi-resolution data structure may contain nodes that correspond to a resolution level of the three dimensional environment. As an example, nodes that are deeper in the geo-spatial multi-resolution data structure may correspond to a higher resolution level. Note that the geo-spatial multi-resolution data structure stored in multi-resolution data structure database 310 may just indicate what data is available at each node. Decode assembler and cache 212 receives and stores the actual data corresponding to the geo-spatial multi-resolution data structure from preprocessing system 130. In an alternate embodiment, not shown, decode assembler and cache 212 stores the geo-spatial multi-resolution data structure and its data.

In an embodiment, each node of the geo-spatial multi-resolution data structure contains vertical slices. Note that the vertical slices are different than child nodes of a parent node in that the vertical slices are embedded in the parent node and correspond to the resolution level of the parent node. In a further embodiment, the vertical slices are associated with a particular altitude range, with this information being stored in the metadata of the node.

The data representing three dimensional objects may include multiple data packets, each data packet corresponding to a range of altitudes. Each data packet or all data packets together may cover the full range of altitudes that the three dimensional object covers. The vertical slices may store the data packet(s) that correspond to its particular altitude range. Together then, the vertical slices that correspond to the three dimensional object cover the range of altitudes that the three dimensional object covers. As an example, each vertical slice at a given node may include data packet(s) that cover a respective single floor of a building. In another example, each vertical slice at the given node may include data packet(s) that cover a respective two meter range of heights of the building.

In some cases, overlap may occur in which successive vertical slices include at least some common data. In a case where characteristics of multiple buildings are stored at the same node, each vertical slice may be assigned to a single building. Alternatively, each vertical slice may store data for any number of buildings within its altitude range. These vertical slices may also be called channels. A more detailed description of a geo-spatial quadtree as an example geo-spatial multi-resolution data structure, including vertical slice addressing, is presented below with respect to FIGS. 5A-B.

In an embodiment, the building data, or any object data in general, may be distributed at different levels of the geo-spatial multi-resolution data structure by pre-processing system 130 of FIG. 1 based on a building's importance. This importance may be measured in several ways. For instance, importance may be determined based on the likelihood the given building may affect the skyline of a view created by client 210 of FIG. 2. In an embodiment, this likelihood may be greatly affected by the height of the given building. In an alternate embodiment, this likelihood may be affected by a product of the height and volume of the given building. The importance may also be determined based on historical significance of the building, current events related to the building, user generated content that targets the building, and the like. Note that the coarser the level a building is located in the geo-spatial multi-resolution data structure (e.g., the closer the node that stores the building data is to the root node), the more important the building is assumed to be, and the earlier it may be displayed by client 210.

Note that the buildings may be positioned on the surface of the three dimensional environment. If the three dimensional environment has a very large surface, such as a three dimensional representation of Earth, then the distribution of building heights matters less the farther from the surface a viewer is. The techniques using vertical slices described above minimize issues that may arise due to these characteristics, including those situations where many empty nodes are created in order to properly represent a building on the surface. Reducing the number of empty nodes may help minimize indexing overhead and/or parsing overhead.

Maximum multi-resolution data structure level database 320 may store coefficients that designate a maximum multi-resolution data structure level given a resolution level in the three dimensional environment. The coefficients may then be used to determine whether data in a node at a given multi-resolution data structure level can be displayed in the three dimensional environment. In an embodiment, the coefficients are pre-calculated. An algorithm that may be used to determine these coefficients is described below.

Frame updater/LOD determiner 218 may determine what data to render and what data to fetch next based on a recursive traversal of a geo-spatial multi-resolution data structure 302 pulled from multi-resolution data structure database 310. Note that frame updater/LOD determiner 218 may perform other functionality than what is described herein. In an embodiment, frame updater/LOD determiner 218 traverses through geo-spatial multi-resolution data structure 302, starting from the root and terminating at branches if it is determined that the geo-spatial locations (e.g., latitude and longitude coordinates) associated with the nodes in these branches do not intersect the view frustum (e.g., the area of the three dimensional environment that may be displayed) or if it is determined that the resolution levels associated with nodes in the branch are too fine in comparison to the resolution level of the three dimensional environment. Termination may be desired in these cases since the data corresponding to these nodes would not be seen by a user viewing the three dimensional environment.

Before or after frame updater/LOD determiner 218 begins traversing geo-spatial multi-resolution data structure 302, frame updater/LOD determiner 218 sends a resolution level query 304 to maximum multi-resolution data structure level database 320, where resolution level query 304 includes the current resolution level in the three dimensional environment. Maximum multi-resolution data structure level database 320 returns a maximum multi-resolution data structure level 306 in response to resolution level query 304, where maximum multi-resolution data structure level 306 represents a coefficient indicating the maximum depth by which frame updater/LOD determiner 218 can traverse geo-spatial multi-resolution data structure 302.

In an embodiment, the coefficients in maximum multi-resolution data structure level database 320 are pre-calculated by taking a sample view frustum at every possible three dimensional environment resolution level, and comparing these sample view frustums against sample nodes that cover a range of latitude and longitude coordinates visible within the respective view frustum, where each view frustum is compared against sample nodes at each level of geo-spatial multi-resolution data structure 302. The comparisons lead to a coefficient for every possible three dimensional environment resolution level that identifies the deepest multi-resolution data structure level frame updater/LOD determiner 218 may traverse to in geo-spatial multi-resolution data structure 302 when at any given resolution level.

Each comparison may include creating a three dimensional shape from the data stored at the sample node. Because each sample node includes a range of latitudes and a range of longitudes, each sample node then corresponds to a spherical polygon on the surface of a sphere, in this case Earth. In other words, each sample node may correspond to a two dimensional surface that covers a part of Earth. Since the metadata of the sample node may store a minimum and a maximum altitude of the data stored at the sample node, a spherical polygon may be extruded corresponding to the sample node to the two altitudes to form a three dimensional shape. In an example, the three dimensional shape may be a box with slightly curved walls. At a same or different time, the two dimensional surface that corresponds to the sample node can also be "cut" out and tilted to face a virtual camera that views the view frustum. In an embodiment, if the two dimensional surface is moved forward towards the virtual camera, such that it passes through a point in the three dimensional shape that is closest to the virtual camera, then it can be determined if the sample node resolution is too fine by looking at the number of pixels needed to display each side of the two dimensional surface within the view frustum. If the number of pixels needed to display any side is below a predetermined threshold, then the resolution level of the sample node is too fine for the particular resolution level of the three dimensional environment. In other words, if the number of pixels needed to display any side is below the predetermined threshold, then the size of the area covered by the two dimensional surface is relatively small as compared to the total area covered within the view frustum. As an example, the predetermined threshold may be 256 pixels. Note that the point in the dimensional shape may be a corner, a face or an edge. Note also that the predetermined threshold may be based on a standard resolution used to represent a tile on the surface of the three dimensional representation of Earth, where the tile encompasses a range of latitudes and longitudes.

Looking at it another way, the above described algorithm helps explain how it is determined which multi-resolution data structure levels contain building data that is deemed to not affect the skyline when at the particular resolution level in the three dimensional environment.

During the traversal, frame updater/LOD determiner 218 chooses a branch of geo-spatial multi-resolution data structure 302 if the coordinate range associated with the branch encompasses the latitude and longitude coordinates of the view frustum. If this is the case, frame updater/LOD determiner 218 analyzes the root node of the branch to determine if any data is present. In an embodiment, frame updater/LOD determiner 218 further analyzes the vertical slices at the root node that correspond to an altitude range visible within the view frustum, if present. If no vertical slice is present, or if no data is present, for the altitude range visible within the view frustum, then the traversal of the branch is terminated. If vertical slice(s) are present for the altitude range visible within the view frustum, and the second condition described above, i.e. whether the resolution levels of the vertical slices are too fine, is met, then the data is extracted from decode assembler and cache 212 for future rendering. Essentially, if vertical slice(s) are present for the altitude range visible within the view frustum, then a two or three dimensional representation of the data stored in these vertical slice(s) is visible within the view frustum.

In a further embodiment, frame updater/LOD determiner 218 may request data fetch analyzer 214 to fetch data in vertical slice(s) that surround the vertical slice(s) associated with the altitude range visible in the view frustum from pre-processing system 130 if the data is not already in decode assembler and cache 212. This request may be made since the altitude ranges of these surrounding vertical slice(s) may be more likely to be visited in the future. Frame updater/LOD determiner 218 may further request data fetch analyzer 214 to fetch data from sibling nodes and/or from child nodes of the root node if that data is not present in decode assembler and cache 212.

Note that a branch may contain a root node in which the surface of the three dimensional environment covered by the range of latitude and longitude coordinates associated with the root node does not appear within the view frustum. Frame updater/LOD determiner 218 may continue traversing this branch as long as the root node, and subsequent child nodes, contain vertical slices associated with altitude ranges within the view frustum, and as long as the second condition described above is satisfied. In this way, any vertical slices viewable within the view frustum will not be missed.

The second condition, checking if the resolution levels associated with nodes in the branch are too fine in comparison to the resolution level of the three dimensional environment, is evaluated by checking maximum multi-resolution data structure level 306. If the resolution level of the root node of the branch is higher than maximum multi-resolution data structure level 306, then the branch is terminated. This check may be performed before or after analyzing the vertical slices of the root node.

If the root node of the branch has been analyzed and the branch has not been terminated, then the process repeats for each of the root node's children, and until all branches have been analyzed and/or terminated.

In an alternate embodiment, if the root node of the branch has been analyzed and the branch has not been terminated, then the multi-resolution data structure level of the root node of the branch is analyzed to see if it equals maximum multi-resolution data structure level 306. If the multi-resolution data structure level equals maximum multi-resolution data structure level 306, then frame updater/LOD determiner 218 stops traversing this branch, and continues to the next branch, if applicable.

Method

Figure 4:
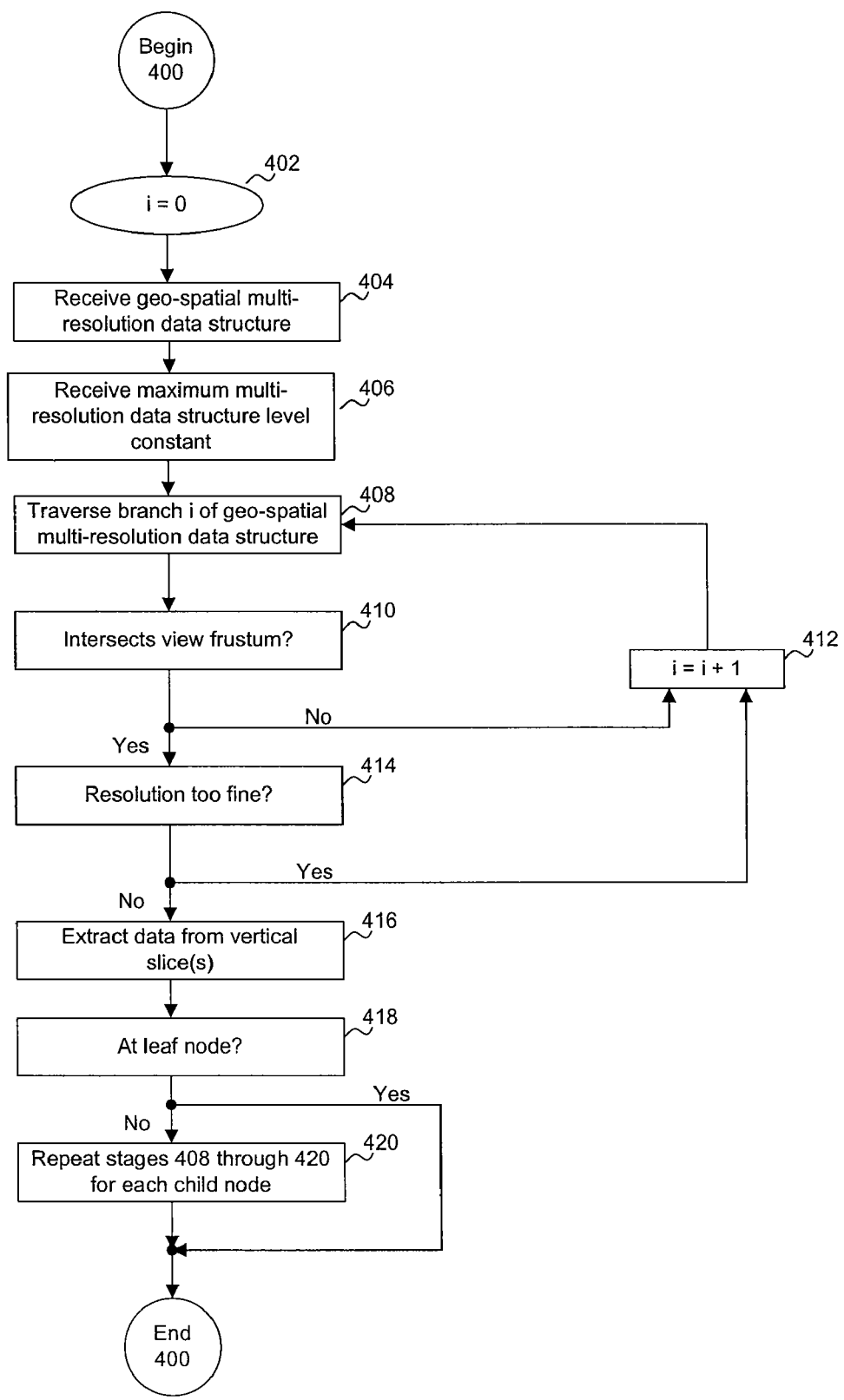
FIG. 4 is a flowchart of a method for parsing indexed data according to an embodiment of the present invention.

This section describes a method used for parsing indexed image data. FIG. 4 is a flowchart of a method 400 for parsing indexed image data according to an embodiment of the present invention. While method 400 is described with respect to an embodiment of the present invention, method 400 is not meant to be limiting and may be used in other applications. In an example, method 400 may be used to parse indexed image data including but not limited to image data organized in a geo-spatial multi-resolution data structure. As shown in FIG. 4, method 400 begins at stage 402 where variable i is set to be equal to zero.

Once stage 402 is complete, method 400 proceeds to stage 404 where a geo-spatial multi-resolution data structure is received. In an embodiment, the geo-spatial multi-resolution data structure may be similar to geo-spatial multi-resolution data structure 302 of FIG. 3 and include one or more vertical slices at each node. Once stage 404 is complete, method 400 proceeds to stage 406.

At stage 406, a maximum multi-resolution data structure level constant is received. In an embodiment, the maximum multi-resolution data structure level constant is pre-calculated and dependent on a resolution level in a three dimensional environment that corresponds to the geo-spatial multi-resolution data structure. The maximum multi-resolution data structure level constant may indicate how deep the geo-spatial multi-resolution data structure may be traversed at the given resolution level. Once stage 406 is complete, method 400 continues to stage 408.

At stage 408, branch i of the geo-spatial multi-resolution data structure is traversed. In an embodiment, the traversal is dependent on the latitude and longitude coordinates within a view frustum viewing the three dimensional environment, the resolution level within the three dimensional environment, and the range of altitudes covered by the view frustum. Once stage 408 is complete, method 400 proceeds to stage 410.

At stage 410, a check is performed to see if a representation of the data stored at the root node of branch i intersects the view frustum. In an embodiment, the root node's vertical slice(s) are analyzed to determine if any vertical slice(s) are present that cover an altitude range visible within the view frustum. If an intersection occurs, then method 400 jumps to stage 414. Otherwise, branch i is terminated and method 400 continues to stage 412.

At stage 412, i is incremented by one. Once this is complete, method 400 returns to stage 408.

At stage 414, a check is performed to see if the resolution of the root node of branch i is too fine. In an embodiment, this may be accomplished by comparing the multi-resolution data structure level of the root node of branch i against the maximum multi-resolution data structure level constant. As an example, if the multi-resolution data structure level of the root node of branch i is less than or equal to the maximum multi-resolution data structure level constant, then the resolution of the root node of branch i is not too fine. In this case, once stage 414 is complete, method 400 continues to stage 416. Otherwise, if the multi-resolution data structure level of the root node of branch i is greater than the maximum multi-resolution data structure level constant, then, once stage 414 is complete, method 400 jumps to stage 412.

At stage 416, data at the node is extracted from its vertical slice(s) for further processing. In a further embodiment, additional data may be requested for fetching, where the additional data may correspond to vertical slice(s) that border the vertical slice(s) that cover altitudes visible within the view frustum. Once stage 416 is complete, method 400 proceeds to stage 418.

At stage 418, a check is performed to see if the root node of branch i is a leaf node. If the root node of branch i is a leaf node, then method 400 ends. In an alternate embodiment, not shown, if the root node of branch i is a leaf node, then method 400 jumps to stage 412. If the root node of branch i is not a leaf node, then method 400 continues to stage 420. In an alternate embodiment, not shown, if the root node of branch is not a leaf node, then the maximum multi-resolution data structure level is compared to the multi-resolution data structure level of the root node of branch i to see if they are equal. If they are equal, method 400 jumps to stage 412. Alternatively, if they are equal, method 400 ends. If they are not equal, method 400 continues to stage 420.

At stage 420, stages 408 through 420 are repeated for each child node of the root node of branch i. Once stage 420 is complete, method 400 ends.

Stages 402, 404, 406, 408, 410, 412, 414, 416, 418, and 420 may be implemented as software, hardware, firmware, or any combination thereof.

Examples

FIGS. 5A-B are representations of a geo-spatial quadtree as an exemplary geo-spatial multi-resolution data structure according to an embodiment of the present invention. FIG. 5A shows a geo-spatial quadtree 500 and an object 502 located in geo-spatial quadtree 500. Geo-spatial quadtree 500 may be similar to geo-spatial multi-resolution data structure 302 in FIG. 3. Object 502 is a three dimensional object divided into six regions 504, 506, 508, 510, 512, and 514. Each region corresponds to a range of altitudes. Data corresponding to each region may be stored in channels or vertical slices of nodes in geo-spatial quadtree 500. Address 516 represents a location of object 502 in geo-spatial quadtree 500, a type of packet, and a channel holding data.

"Q0231" of address 516 represents the location of object 502 in geo-spatial quadtree 500. The numbers refer to which quadrant of geo-spatial quadtree 500 a system should traverse in order to find object 502. In this case, a system would need to first traverse through the first child of the root node, or the first quadrant, followed by the third child, the fourth child, and finally the second child in order to reach object 502. Data corresponding to regions 504, 506, 508, 510, 512, and 514 may be stored at in vertical slices at the node in geo-spatial quadtree 500 identified by '0231."

"d50003" of address 516 refers to the packet type of data held in the channels. In this case, data held in the channels is of images or textures. Packet types may refer to any type of different data including, for example, terrain.

"003" of address 516 identifies a channel or vertical slice that holds height or altitude based data. In this case, "003" may refer to data that corresponds to region 510 of object 502. In an embodiment, the channel numbers may increment in numerical order.

FIG. 5B shows another representation of the data structure of geo-spatial quadtree 500. The root node of geo-spatial quadtree 500, node 550, has four children, nodes 552, 554, 556, and 558. In an embodiment, node 552 includes vertical slices that can store data, such as, for example object 502 data, represented by slices 560, 562, 564, and 566. Note that node 552 may include more or fewer vertical slices than what is displayed in FIG. 5B. In a further embodiment, each node 552, 554, 556, and 558 contains vertical slices. Node 552, as well as its sibling nodes, may have their own children, like nodes 572, 574, 576, and 578, and this pattern may repeat indefinitely. Note that vertical slices are different from child nodes in that vertical slices reside at the same quadtree level as the parent node. FIGS. 5A-B are strictly illustrative and are not intended to limit the invention. Other types of geo-spatial multi-resolution data structure can also be used.

In this way, a geo-spatial multi-resolution data structure may be used to organize data at a plurality of resolutions depending upon height of an object of interest as perceived by a virtual camera or client. Using such geo-spatial multi-resolution data structure can reduce indexing and addressing overhead for the height dimension in a three dimensional environment. The techniques using vertical slices described above minimize issues that may arise due to situations where many empty nodes are created in order to properly represent an object of interest (e.g. a building on the Earth surface). Reducing the number of empty nodes may also help minimize indexing overhead and/or parsing overhead. Therefore, the vertical slices help balance the granularity of data access with the overhead of the geo-spatial multi-resolution data structure and its addressing scheme.

Conclusion

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for parsing indexed data, comprising:
    (a) storing a geo-spatial multi-resolution data structure that represents a three dimensional environment, wherein at least a portion of the three dimensional environment lies within a view frustum, and at least one node of the geo-spatial multi-resolution data structure comprises one or more vertical slices containing data in a dimension different than dimensions associated with the node;
    (b) traversing recursively the geo-spatial multi-resolution data structure, wherein the traversal is based on a range of coordinates that lie within the view frustum, wherein the traversal comprises:
        (i) choosing a branch of the geo-spatial multi-resolution data structure if the branch corresponds to at least a portion of the range of coordinates that lie within the view frustum; and
        (ii) analyzing a root node of the branch to determine if indexed data stored at the root node is to be displayed within the view frustum, wherein the analyzing comprises:
            determining if the indexed data stored at the root node covers at least a portion of a range of altitudes that lie within the view frustum; and
            determining if a multi-resolution data structure level of the root node is less than or equal to the maximum multi-resolution data structure level constant,
        wherein, if the indexed data stored at the root node covers at least the portion of the range of altitudes that lie within the view frustum and the multi-resolution data structure level of the root node is less than or equal to the maximum multi-resolution data structure level constant, the indexed data stored at the root node is to be displayed within the view frustum; and
    (c) extracting the indexed data from at least one vertical slice of at least one node of the geo-spatial multi-resolution data structure, wherein the extracted indexed data is displayed in the view frustum.

2. The computer-implemented method of claim 1, further comprising:
    (d) receiving a maximum multi-resolution data structure level constant.

3. The computer-implemented method of claim 1, further comprising:
    (iii) repeating steps (i) and (ii) for each node in the branch.

4. The computer-implemented method of claim 3, further comprising:
    (iv) repeating steps (i) through (iii) for each branch in the geo-spatial multi-resolution data structure.

5. The computer-implemented method of claim 1, further comprising:
    (iii) repeating steps (i) and (ii) for each node in the branch that is located at a multi-resolution data structure level in the geo-spatial multi-resolution data structure less than or equal to the maximum multi-resolution data structure level constant.

6. The computer-implemented method of claim 1, wherein step (c) comprises extracting, for each analyzed node of the geo-spatial multi-resolution data structure, the indexed data from the at least one vertical slice of the respective node that corresponds to at least the portion of the range of altitudes that lie within the view frustum.

7. The computer-implemented method of claim 1, further comprising:
    (d) fetching indexed data stored in at least one vertical slice adjacent to the at least one vertical slice that stores the extracted indexed data.

8. A system for parsing indexed data, comprising:
    a frame updater/level of detail (LOD) determiner that is configured to:
    (a) store a geo-spatial multi-resolution data structure that represents a three dimensional environment, wherein at least a portion of the three dimensional environment lies within a view frustum, and at least one node of the geo-spatial multi-resolution data structure comprises one or more vertical slices containing data in a dimension different than dimensions associated with the node, (b) traverse recursively the geo-spatial multi-resolution data structure, wherein the traversal is based on a range of coordinates that lie within the view frustum, and (c) extract the indexed data from at least one vertical slice of at least one node of the geo-spatial multi-resolution data structure, wherein the extracted indexed data is displayed in the view frustum, (d) receive a maximum multi-resolution data structure level constant, (e) traverse the geo-spatial multi-resolution data structure by choosing a branch of the geo-spatial multi-resolution data structure if the branch corresponds to at least a portion of the range of coordinates that lie within the view frustum, and by analyzing a root node of the branch to determine if indexed data stored at the root node is to be displayed within the view frustum, and (f) analyze the root node of the branch by:

determining if the indexed data stored at the root node covers at least a portion of a range of altitudes that lie within the view frustum, and determining if a multi-resolution data structure level of the root node is less than or equal to the maximum multi-resolution data structure level constant, wherein, if the indexed data stored at the root node covers at least the portion of the range of altitudes that lie within the view frustum and the multi-resolution data structure level of the root node is less than or equal to the maximum multi-resolution data structure level constant, the indexed data stored at the root node is to be displayed within the view frustum.

9. The system of claim 8, wherein the frame updater/LOD determiner is further configured to repeat the traverse for each node in the branch.

10. The system of claim 9, wherein the frame updater/LOD determiner is further configured to repeat the traverse for each branch in the geo-spatial multi-resolution data structure.

11. The system of claim 8, wherein the frame updater/LOD determiner is further configured to repeat the traverse for each node in the branch that is located at a multi-resolution data structure level in the geo-spatial multi-resolution data structure less than or equal to the maximum multi-resolution data structure level constant.

12. The system of claim 1, wherein the frame updater/LOD determiner is configured to extract, for each analyzed node of the geo-spatial multi-resolution data structure, the indexed data from the at least one vertical slice of the respective node that corresponds to at least the portion of the range of altitudes that lie within the view frustum.

13. The system of claim 8, wherein the frame updater/LOD determiner is further configured to fetch indexed data stored in at least one vertical slice adjacent to the at least one vertical slice that stores the extracted indexed data.

14. The system of claim 8, further comprising a multi-resolution data structure database configured to store the geo-spatial multi resolution data structure.

15. The system of claim 8 further comprising a multi-resolution data structure level database configured to store one or more coefficients designating a multi-resolution data structure level.

16. A computer-implemented method for storing data in a geo-spatial multi-resolution data structure, comprising:

(a) extracting data representing a three dimensional object in a three dimensional environment, the data made up of a plurality of packets, wherein the three dimensional object includes a coordinate and an importance, and wherein the data covers a range of altitudes, wherein at least a portion of the three dimensional environment lies within a view frustum, and at least one node of the neo-spatial multi-resolution data structure comprises one or more vertical slices containing data in a dimension different than dimensions associated with the node;

(b) traversing the geo-spatial multi-resolution data structure to find a node that encompasses the coordinate, wherein a multi-resolution data structure level of the node is associated with the importance, wherein the traversal comprises:

(i) choosing a branch of the geo-spatial multi-resolution data structure if the branch corresponds to at least a portion of the range of coordinates that lie within the view frustum; and (ii) analyzing a root node of the branch to determine if indexed data stored at the root node is to be displayed within the view frustum, wherein the analyzing comprises:

determining if the indexed data stored at the root node covers at least a portion of a range of altitudes that lie within the view frustum; and determining if a multi-resolution data structure level of the root node is less than or equal to the maximum multi-resolution data structure level constant, wherein, if the indexed data stored at the root node covers at least the portion of the range of altitudes that lie within the view frustum and the multi-resolution data structure level of the root node is less than or equal to the maximum multi-resolution data structure level constant, the indexed data stored at the root node is to be displayed within the view frustum; and (c) storing the data in vertical slices at the node for later rendering and displaying of the three dimensional object by a client.

17. The computer-implemented method of claim 16, wherein each vertical slice is annotated with an altitude range, and wherein a union of each vertical slice altitude range equals an altitude range of the three dimensional object.

18. The computer-implemented method of claim 17, wherein step (c) comprises storing each packet of data in a vertical slice that corresponds to its range of altitudes.

19. The computer-implemented method of claim 16, wherein successive vertical slices include at least one similar data packet.

20. The computer-implemented method of claim 16, wherein each vertical slice is located at a same multi-resolution data structure level as the node.

* * * * *